United States Patent
Pan

(10) Patent No.: US 11,167,868 B2
(45) Date of Patent: Nov. 9, 2021

(54) AUTOMATIC FOOD-BOXING DEVICE FOR COOKED FOOD OF FOOD FRYING MACHINES

(71) Applicant: O-VIEW Technology Co., Ltd., New Taipei (TW)

(72) Inventor: Chia-I Pan, New Taipei (TW)

(73) Assignee: O-VIEW TECHNOLOGY CO., LTD, New Taipei (TW)

(*) Notice: Subject to any disclaimer, the term of this patent is extended or adjusted under 35 U.S.C. 154(b) by 0 days.

(21) Appl. No.: 17/096,888

(22) Filed: Nov. 12, 2020

(65) Prior Publication Data

US 2021/0139173 A1 May 13, 2021

(30) Foreign Application Priority Data

Nov. 13, 2019 (TW) ................................. 108141255

(51) Int. Cl.
- B65B 5/06 (2006.01)
- B65B 35/12 (2006.01)
- A47J 37/12 (2006.01)
- B65B 41/02 (2006.01)

(52) U.S. Cl.
CPC ............ B65B 5/06 (2013.01); A47J 37/1228 (2013.01); B65B 35/12 (2013.01); B65B 41/02 (2013.01)

(58) Field of Classification Search
CPC ......... B65B 39/12; B65B 43/42; B65B 43/54; B65B 35/02; B65B 35/405; B65B 5/068; B65B 43/44; B65B 35/12; B65B 41/00; A47J 37/1228; A47J 37/047; A47J 37/1295; B65G 59/06; B65G 59/10; B65G 57/165

USPC .......................................................... 99/357
See application file for complete search history.

(56) References Cited

U.S. PATENT DOCUMENTS

| | | | | |
|---|---|---|---|---|
| 3,895,574 A | * | 7/1975 | Nyborg ................... | B41F 17/26 101/37 |
| 4,327,826 A | * | 5/1982 | Wilson .................... | B65B 43/44 198/468.1 |
| 4,361,263 A | * | 11/1982 | Thomas .................. | B65B 43/44 206/521.1 |
| 4,909,412 A | * | 3/1990 | Cerf ...................... | B65G 59/105 221/1 |
| 5,546,848 A | * | 8/1996 | Naramura ................ | A21C 9/04 99/326 |
| 5,613,345 A | * | 3/1997 | Saito ....................... | B65B 43/44 53/266.1 |
| 6,095,036 A | * | 8/2000 | Tocchet .............. | G07F 17/0078 62/250 |
| 2013/0209207 A1 | * | 8/2013 | Longobardi ............ | B65B 5/101 414/728 |
| 2015/0013550 A1 | * | 1/2015 | Lin .......................... | A47J 37/04 99/404 |

(Continued)

*Primary Examiner* — Gregory W Adams
(74) *Attorney, Agent, or Firm* — Muncy, Geissler, Olds & Lowe, P.C.

(57) ABSTRACT

An automatic food-boxing device for cooked food of food frying machines is disclosed, which pushes a container by means of a load stage to a position below the front side of a food frying pot, the, while the food frying pot consistently stirs and rotates the materials poured therein, the container can at the same time move along with the rotation angle such that the food processed in the food frying pot can be completely poured into the container without dropping out of it.

9 Claims, 18 Drawing Sheets

(56) References Cited

U.S. PATENT DOCUMENTS

2016/0068797 A1\* 3/2016 Kuzan ...................... B65B 3/26
53/468

\* cited by examiner

AUTOMATIC FOOD-BOXING DEVICE FOR COOKED FOOD OF FOOD FRYING MACHINES

BACKGROUND OF THE INVENTION

1. Field of the Invention

The present invention generally relates to an automatic food-boxing device for cooked food of food frying machines; more specifically, it concerns an automatic or semi-automatic equipment for cooking food, and particularly, it is about an equipment capable of automatically pouring the fried food so as to be loaded in a container.

2. Description of Related Art

The advancements of science and technologies facilitate significant convenience to human life, and automated equipments also save lots of manpower costs and reduce technical problems which may be incurred because of human labors. In addition, as the population grows and human demands for food increase greatly, in order to ensure the stability of cooking quality, many restaurants and hotels formulate systematic protocols and processes regarding to relevant production processes from the material sources, production steps, proportion allocations, time arrangements, temperature controls and further to hardware cleaning operations.

Currently, it is well-known that, after the food is fry-cooked by automated equipment, it will enter a type of packaging or boxing processes, but so far the packaging process is merely to place a container at a predetermined position, and then directly pour the fried and cooked food into the container. However, the point is that such a direct dumping approach may not be stably controlled, which makes the food easy to spill out of the container, causing undesirable waste and environmental mess issues.

Therefore, the present invention provides an automatic food-boxing device for cooked food of food frying machines which, by means of controlling the tilting angle of the frying pan and allowing the container to move synchronously on the path corresponding to the tilting angle of the frying pan, the problem about spilling the fried food out of the container can be significantly reduced, so that the automatic food-boxing device for cooked food of food frying machines according to the present invention can be an optimal solution.

SUMMARY OF THE INVENTION

An automatic food-boxing device for cooked food of food frying machines according to the present invention is disclosed, comprising a machine body, at least one food frying pot, a load stage, a container supply device and a master controller, wherein the machine body is configured with at least a support body and a long slide track, and one end of the long slide track is installed with a slide track driver; the food frying pot is mounted on the support body and pivotally installed with a servo motor; the load stage has a movable seat installed on the long slide track and is installed with a cylinder including a first layer board, the first layer board is set up with a transfer motor and a transfer device, the transfer device is installed with a second layer board, and the second layer board is openly configured with a load hole; the container supply device includes a placement shelf installed beside the long slide track, the inside of the placement shelf is used for filling a large number of stacked containers, an outlet is openly configured below the placement shelf, the two sides corresponding to the lower part of the outlet are respectively installed with mutually symmetrical container supply assemblies, each of such container supply assemblies has a first abutment block located below the outlet, a second abutment block is installed below the first abutment block, the first abutment block and the second abutment block are respectively used to abut against the lower end edges of the lowest or the second lowest containers, the first abutment block and the second abutment block are respectively assembled on at least one control component, a first lifter device is also installed below the container supply assembly, and a first sucking device is further set up on the first lifer device; and the master controller is respectively connected to the slide track driver, the servo motor, the transfer motor, the control component, the first lifter device and the first sucking device thereby controlling the actions and parameters of such elements.

Accordingly, the servo motor turns the food frying pot to an inclined angle, the cylinder pushes at the same time the first layer board to a start position below the front side of the food frying pot, then the transfer motor and the servo motor operate simultaneously to turn and flip the food frying pot, the transfer motor brings at the same time the transfer device to allow the push block to drive the second layer board such that the second layer board also moves together along with the flipped angle, the food inside the food frying pot can be sequentially poured little by little into the container placed in the load hole, and all the food can be completely poured into such containers when the second layer board reaches an end position.

In a preferred embodiment, the servo motor is installed inside the support body.

In a preferred embodiment, at least a baffle is installed on one side of each support body, and the baffle and the long slide track are correspondingly located on the same side of each support body.

In a preferred embodiment, a position difference sensing device connected to the master controller is installed on the outside of the food frying pot, the position difference sensing device respectively includes a start position determination block, an end position determination block, a start sensing terminal and an end sensing terminal, in which the start position determination block and the end position determination block are individually installed on the surfaces of the exterior of the food frying pot opposite to the support body, while the start sensing terminal and the end sensing terminal are individually installed on the surfaces of the exterior of the support body opposite to the food frying pot, and the position difference sensing device is applied to sense the positions of the initial and the final points during the rotation of the food frying pot in order to restrict the food frying pot to move within a safe angle range.

In a preferred embodiment, a position limiting slot is set up on the first layer board, a position limiting block is set up on the second layer board, and the position limiting block is pivotally installed within the position limiting slot thereby allowing the second layer board to move more stably.

In a preferred embodiment, a position shift sensing device is installed between the first layer board and the second layer board, the position shift sensing device is connected to the master controller and has plural stroke sensing seats installed on the first layer board as well as a sensor installed on the second layer board, and the sensor can sequentially pass each of the stroke sensing seats by means of moving along with the second board so as to further incessantly acquire the position messages about the movement of the second layer board thereby precisely controlling the synchronous operations of the transfer motor and the servo motor.

In a preferred embodiment, the transfer device has two gears and one belt, and one of such two gears is installed on the transfer motor while the other one is pivotally installed on the first layer board, and the belt is set on such two gears, the bottom of the second layer board is installed with at least one push block which is used to be fixedly installed on the belt such that the belt can bring the second layer board to move.

In a preferred embodiment, the lateral side of the push component is openly configured with a recess portion.

In a preferred embodiment, a meal delivery device is installed beside the long slide track and includes a preset stage installed beside the long slide track, a second lifter device is set up below the preset stage and a second sucking device is installed on the second lifter device, a transfer device is installed beside the preset stage, and a push component is installed on the preset stage and connected to a push motor, and wherein the second lifter device, the second sucking device, the transfer device and the push motor are all electrically connected to the master controller.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
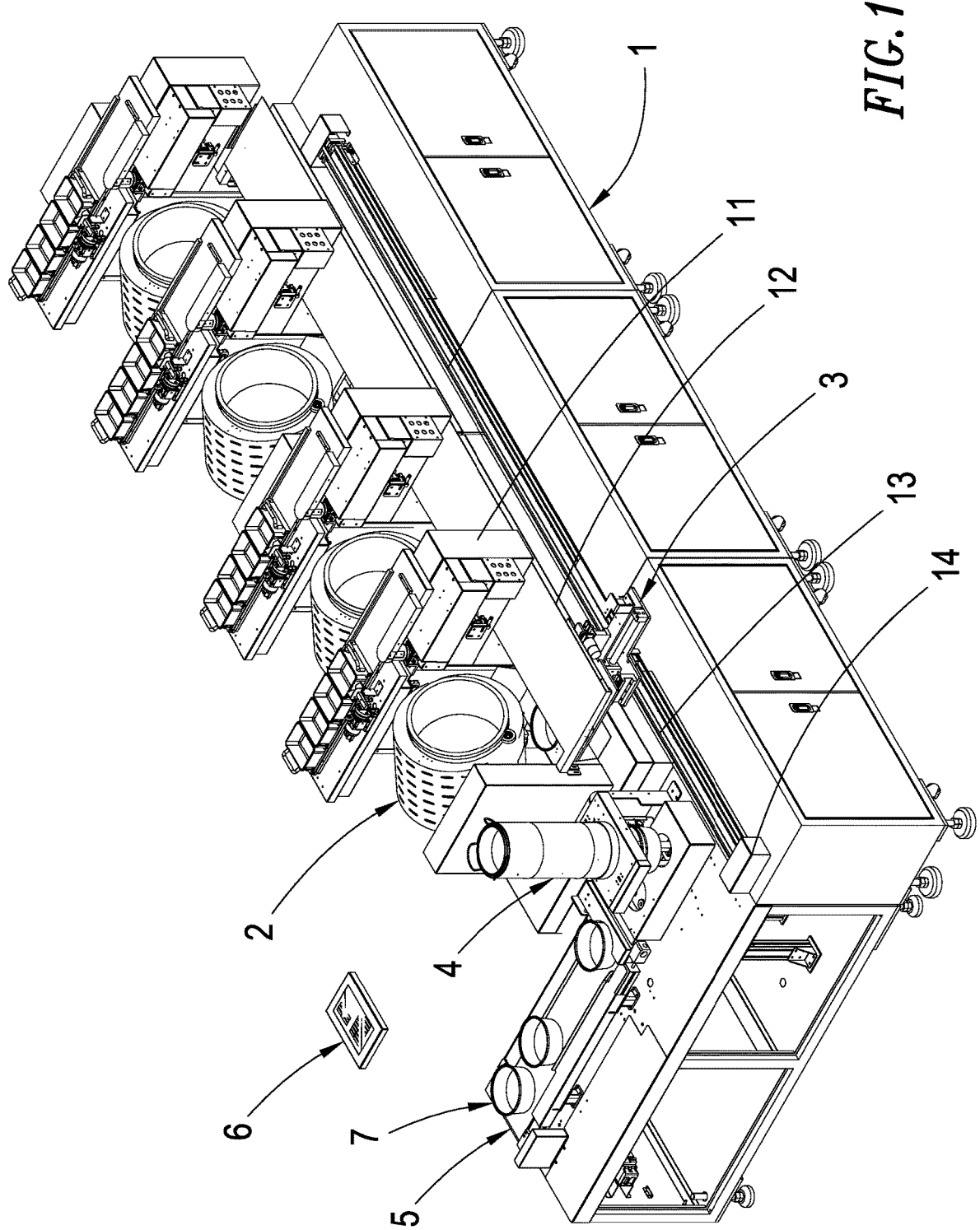
FIG. 1 shows an overall structural stereo view of the food frying machine according to the present invention.
Figure 2:
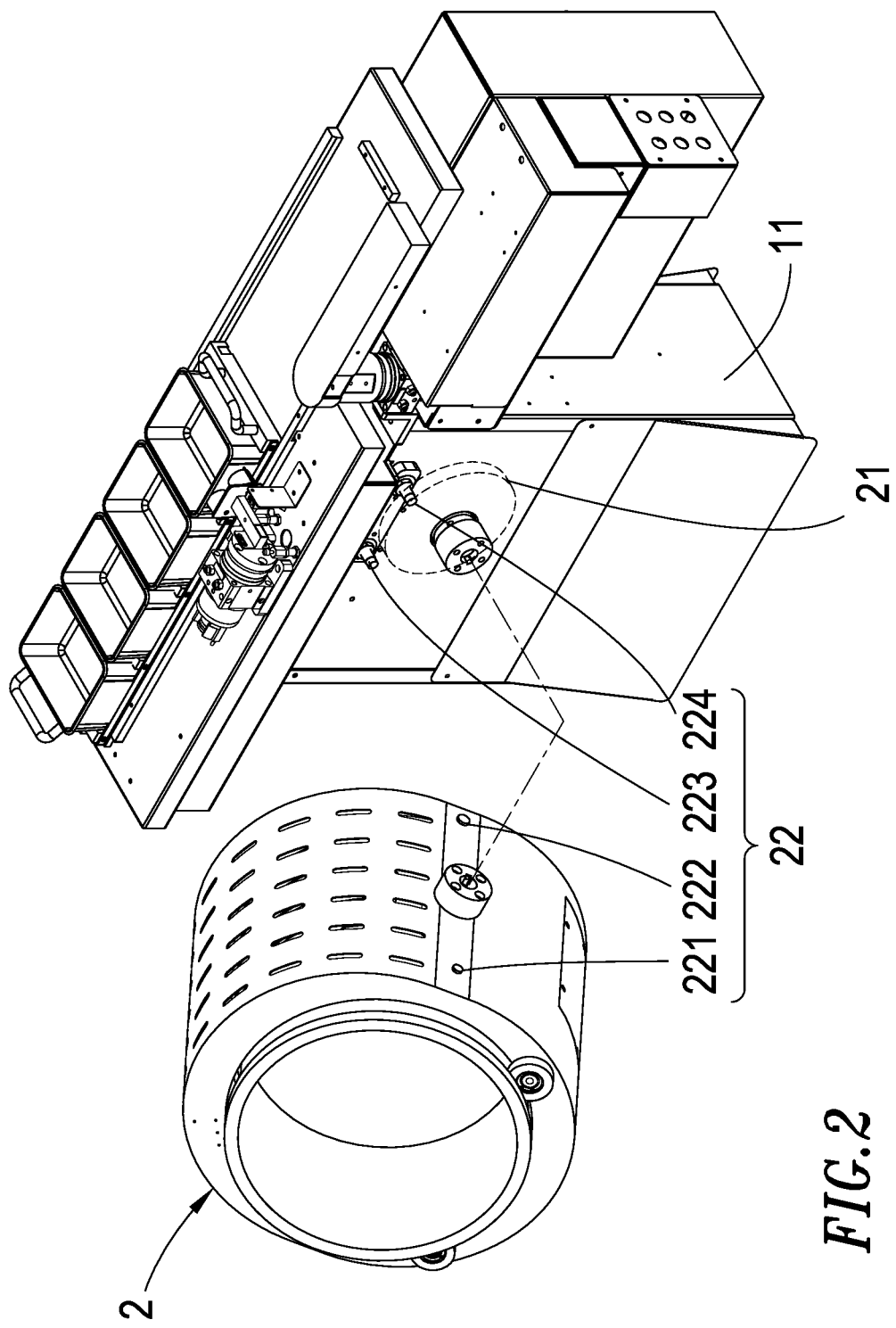
FIG. 2 shows a stereo disassembled view of the food frying pot in the food frying machine according to the present invention.

Refer first to FIGS. 1~2, wherein an overall structural stereo view and a locally stereo disassembled view for the automatic food-boxing device for cooked food of food frying machines according to the present invention are respectively shown, and, as illustrated therein, it comprises a machine body 1, at least one food frying pot 2, a load stage 3, a container supply device 4, a meal delivery device 5 and a master controller 6.

Herein the machine body is configured with at least a support body 11 and a long slide track 13, in which one side of each support body 11 is installed with at least a baffle 12, the baffle 12 and the long side track 13 correspond on the same side of each support body 11, and one end of the long slide track 13 is installed with a slide track driver 14.

Also, the food frying pot 2 is mounted on the support body 11, and the food frying pot 2 and a server motor 21 are mutually pivoted. In the present embodiment, the servo motor 21 is installed inside the support body 11 and used to memorize the rotation angle to control the working position of the food frying pot 2, and a position difference sensing device 22 is installed on the outside of the food frying pot 2 and used to sense the initial point and final point positions of the food frying pot 2 during the stir and rotation operations in order to restrict the food frying pot 2 to move within a safe angle range; in addition, the position difference sensing device 22 respectively includes a start position determination block 221, an end position determination block 222, a start sensing terminal 223 and an end sensing terminal 224, in which the start position determination block 221 and the end position determination block 222 are individually installed on the surfaces of the exterior of the food frying pot 2 opposite to the support body 11, while the start sensing terminal 223 and the end sensing terminal 224 are individually installed on the surfaces of the exterior of the support body 11 opposite to the food frying pot 2.

Figure 3:
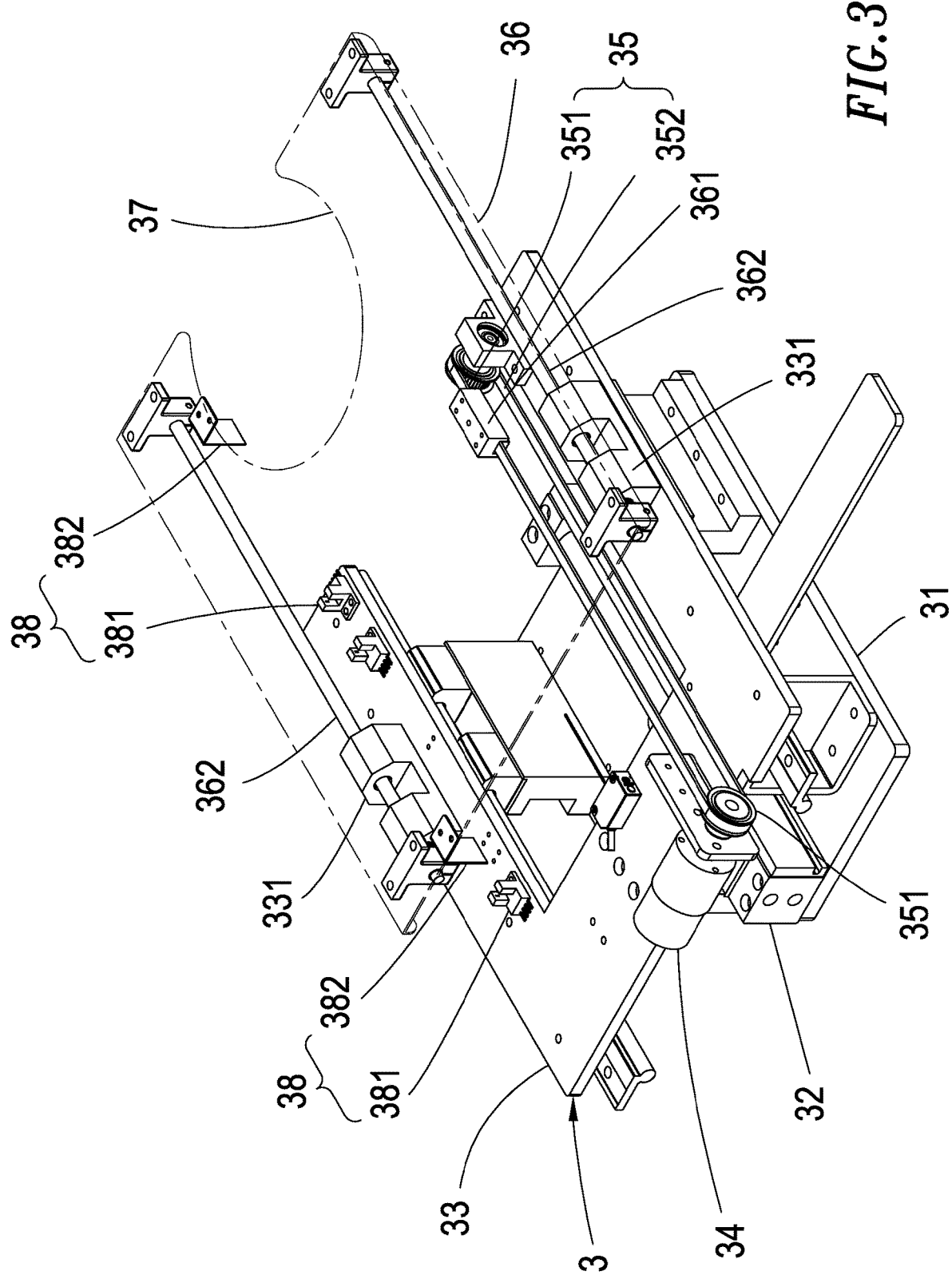
FIG. 3 shows a stereo view of the load stage in the food frying machine according to the present invention.
Figure 4:
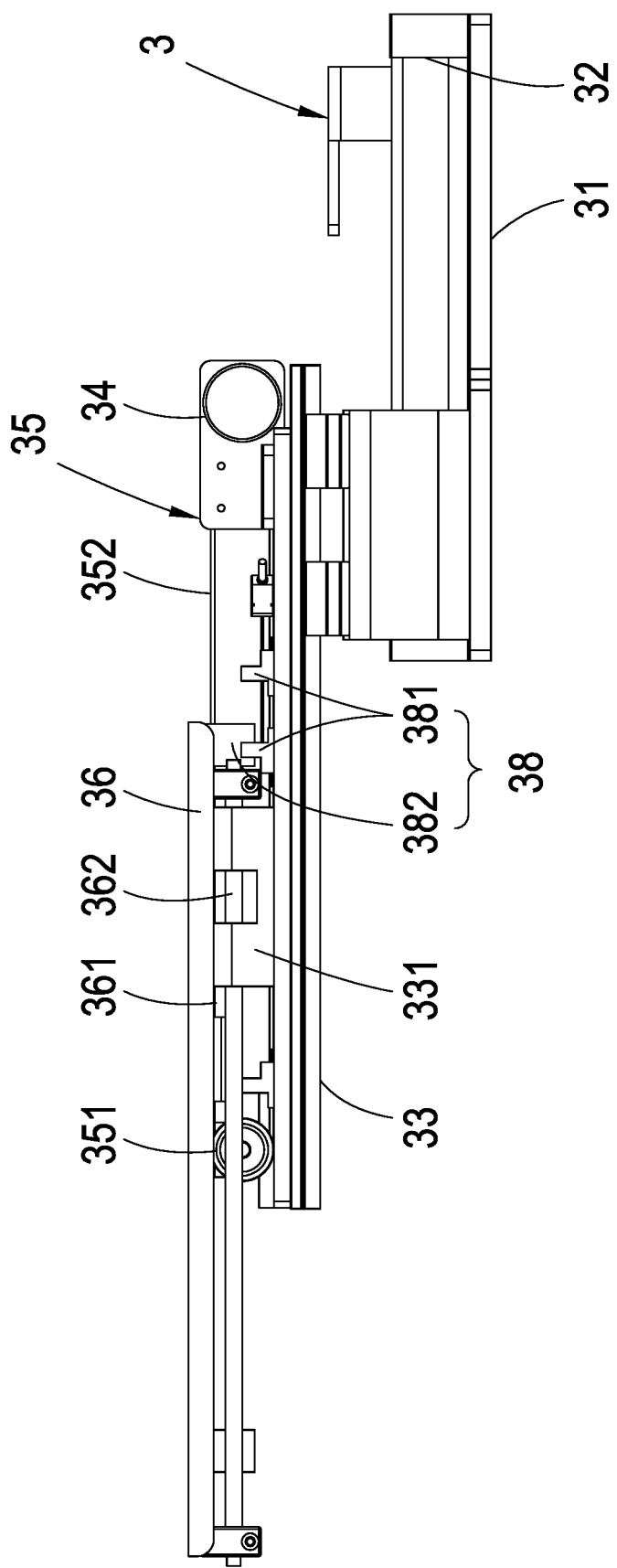
FIG. 4 shows a planar view of the load stage in the food frying machine according to the present invention.
Figure 5:
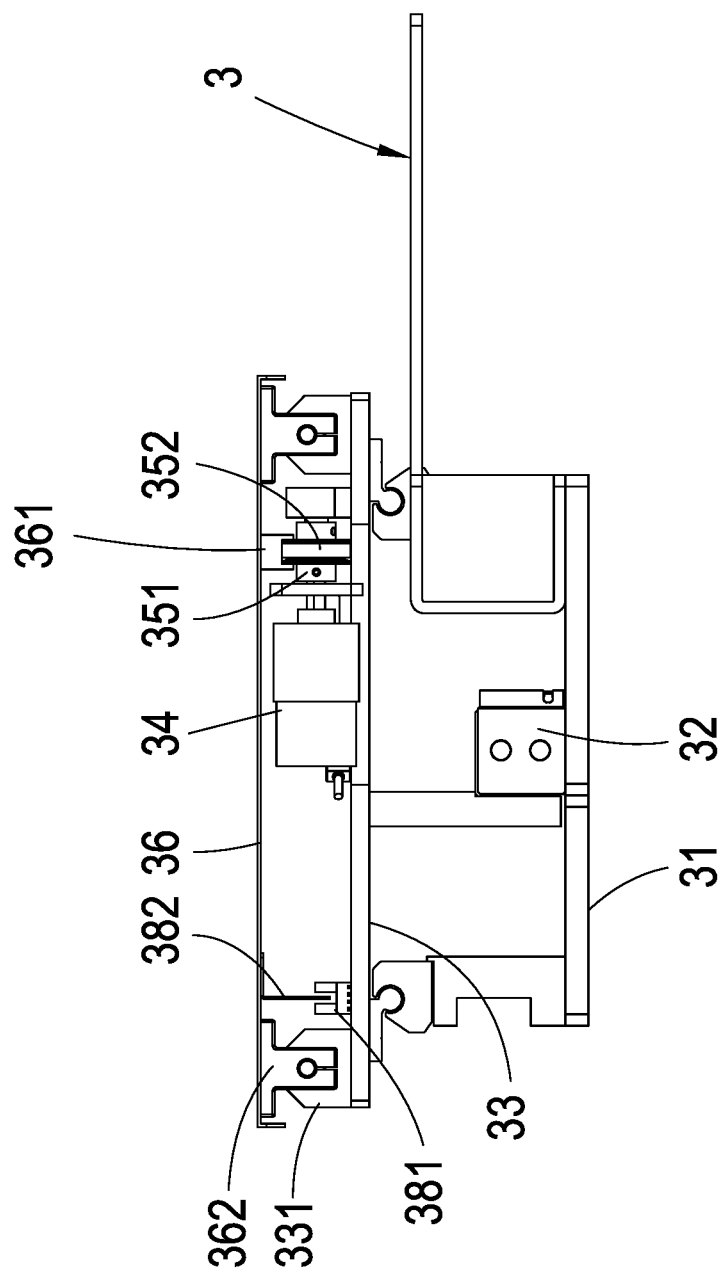
FIG. 5 shows a planar view of the load stage in the food frying machine according to the present invention, observed from another viewing angle.

In addition, referring conjunctively to FIGS. 3~5, the load stage 3 has a movable seat 31 installed on the long slide track 13, in which the movable seat 31 is installed with a cylinder 32 including a first layer board 33, the first layer board 33 is set up with a transfer motor 34 and a transfer device 35, the transfer device 35 is installed with a second layer board 36; besides, the transfer device 35 has two gears 351 and one belt 352, and one of such two gears 351 is installed on the transfer motor 34 while the other one 351 is pivotally installed on the first layer board 33, and the belt 352 is set on such two gears 351, the bottom of the second layer board 36 is further installed with at least one push block 361 which is used to be fixedly installed on the belt 352, and the second layer board 36 is also openly configured with a load hole 37.

Figure 6:
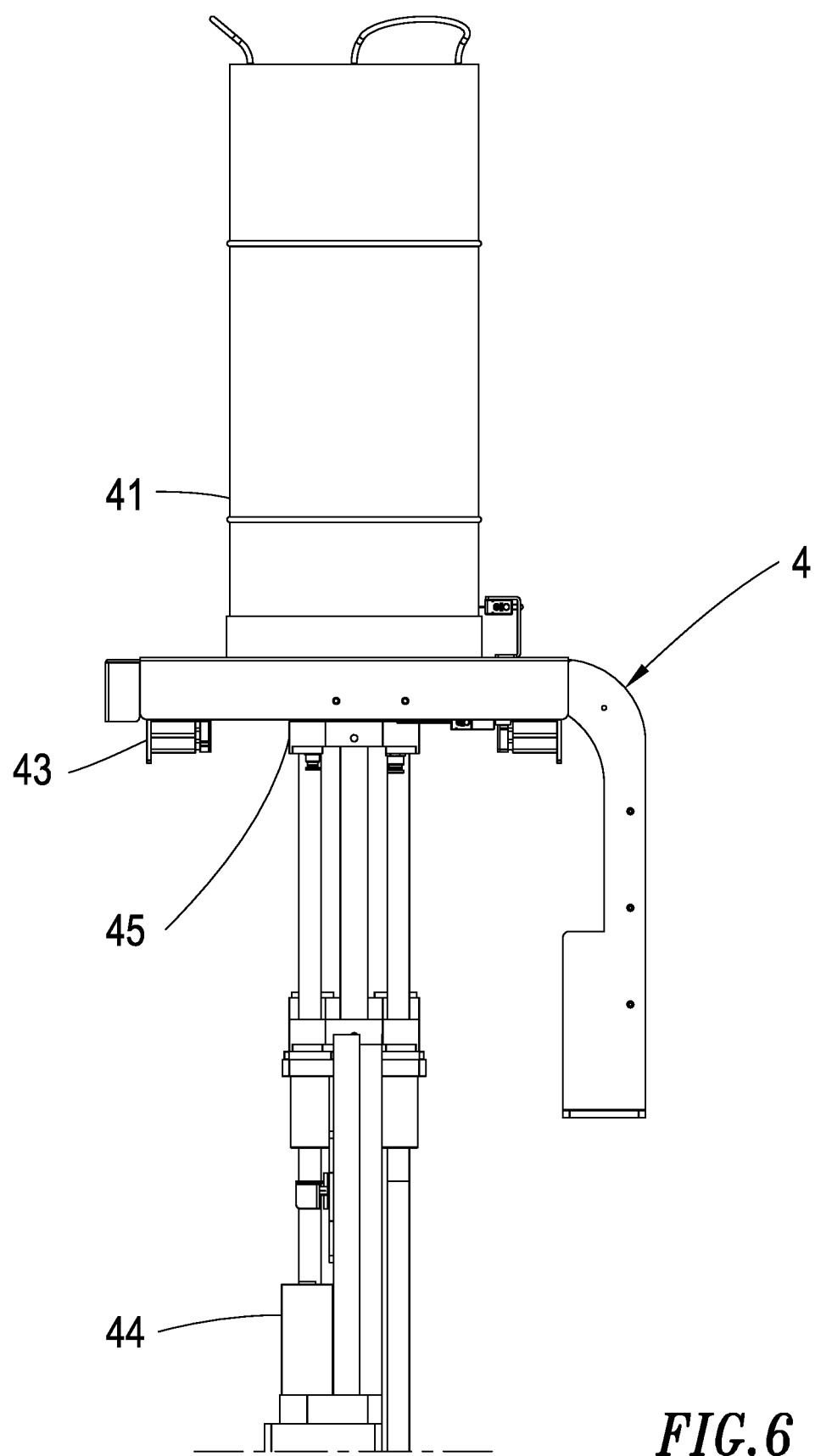
FIG. 6 shows a planar view of the container supply device in the food frying machine according to the present invention.
Figure 7:
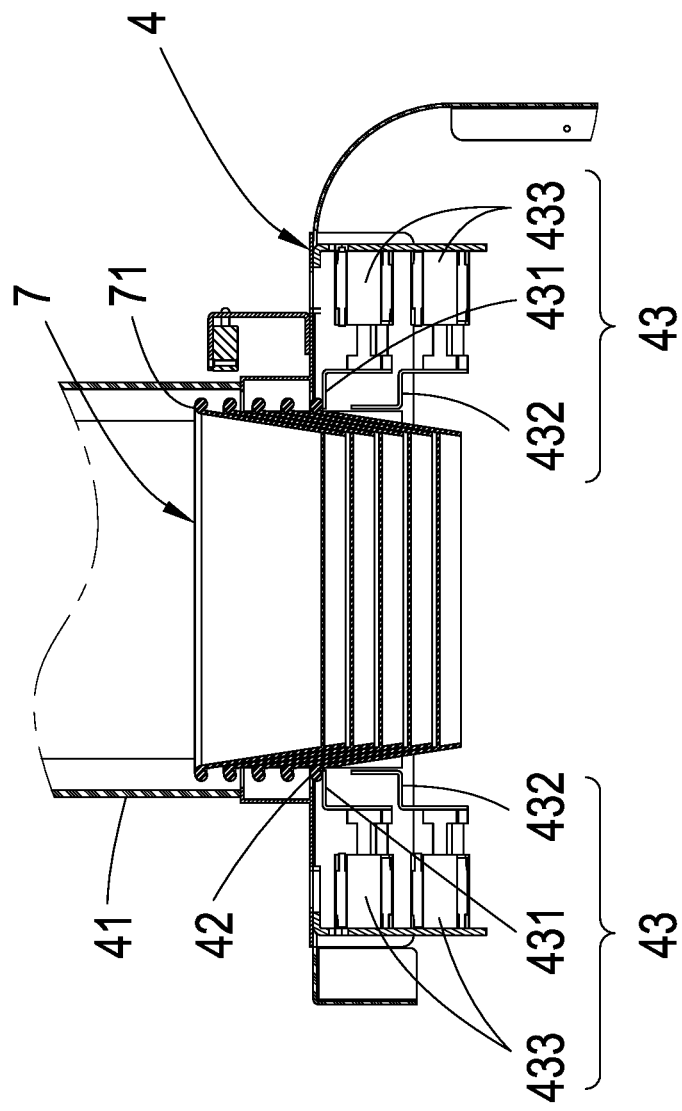
FIG. 7 shows a locally cross-sectioned view of the container supply device in the food frying machine according to the present invention.

Meanwhile, referring conjunctively to FIGS. 1 and 6~7, the container supply device 4 includes a placement shelf 41 installed beside the long slide track 13, in which the inside of the placement shelf 41 is used for filling a large number of stacked containers 7, an outlet 42 is openly configured below the placement shelf 41, the two sides corresponding to the lower part of the outlet 42 are respectively installed with mutually symmetrical container supply assemblies 43, each of such container supply assemblies 43 has a first abutment block 431 located below the outlet 42, a second abutment block 432 is installed below the first abutment block 431, the first abutment block 431 and the second abutment block 432 are respectively used to abut against the lower end edges 71 of the lowest or the second lowest containers 7, the first abutment block 431 and the second abutment block 432 are respectively assembled on a control component 433, a first lifter device 44 is also installed below the container supply assembly 43, and a first sucking device 45 is further set up on the first lifter device 44.

Figure 8:
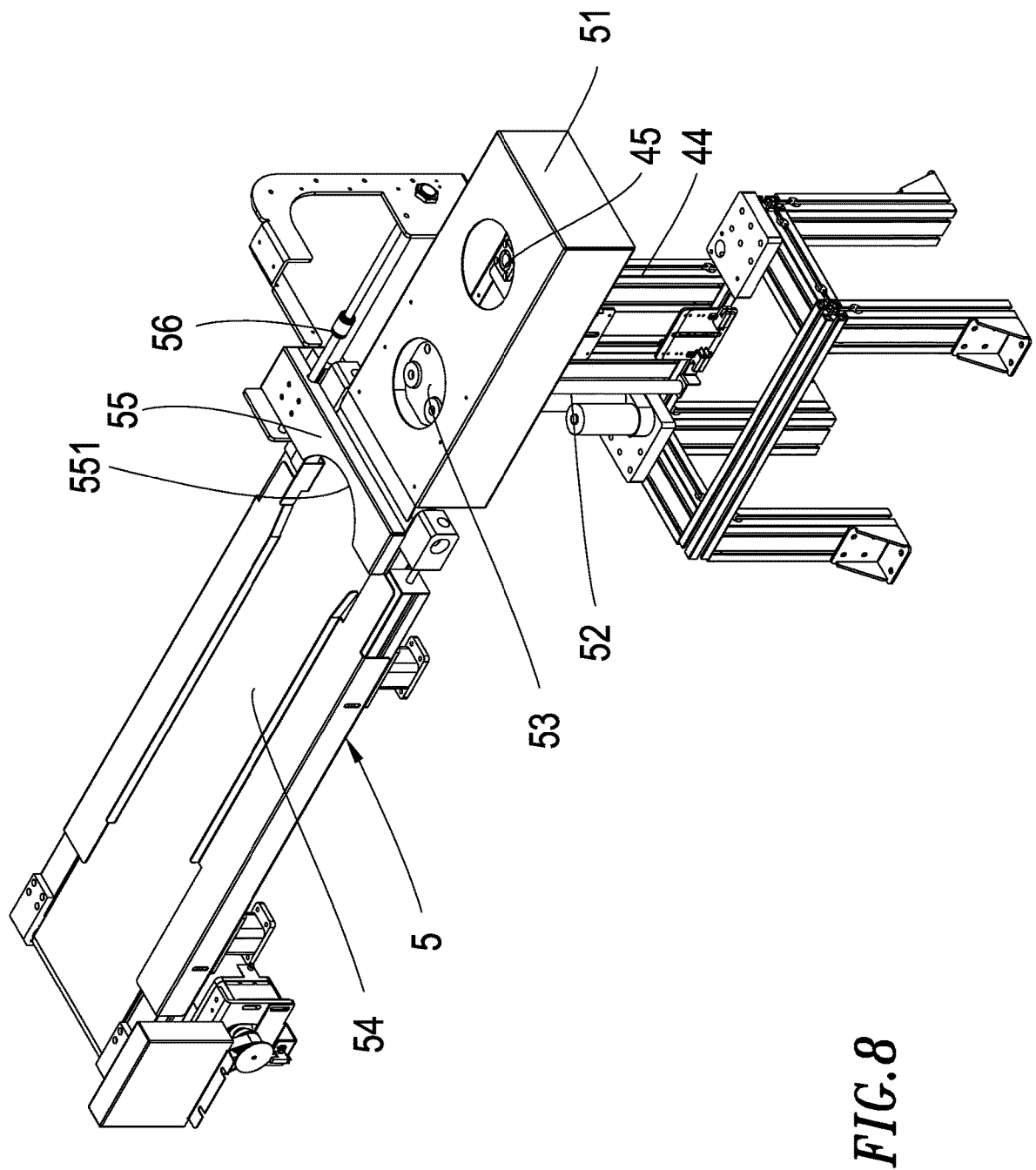
FIG. 8 shows a stereo view of the meal delivery device in the food frying machine according to the present invention.

Moreover, further referring conjunctively to FIGS. 1 and 8, the meal delivery device 5 includes a preset stage 51 installed beside the long slide track 13, a second lifter device 52 is set up below the preset stage 51 and a second sucking device 53 is installed on the second lifter device 52, a transfer device 54 is installed beside the preset stage 51, and a push component 55 is installed on the preset stage 51, the lateral side of the push component 55 can be openly configured with a recess portion 551, and the push component 55 is connectedly installed with a push motor 56 which can drive the push component 55 to move from the upper part of the preset stage 51 to the transfer device 54.

Next, referring conjunctively to FIGS. 1~8, the master controller 6 is respectively connected to the slide track driver 14, the servo motor 21, the position difference sensing device 22, the transfer motor 34, the position shift sensing device 38, the control component 433, the first lifter device 44, the first sucking device 45, the second lifter device 52, the first sucking device 53, the transfer device 54 and the push motor 56 thereby controlling the actions and parameters of such elements, in which available setting options may include automatic and manual modes.

Figure 9:
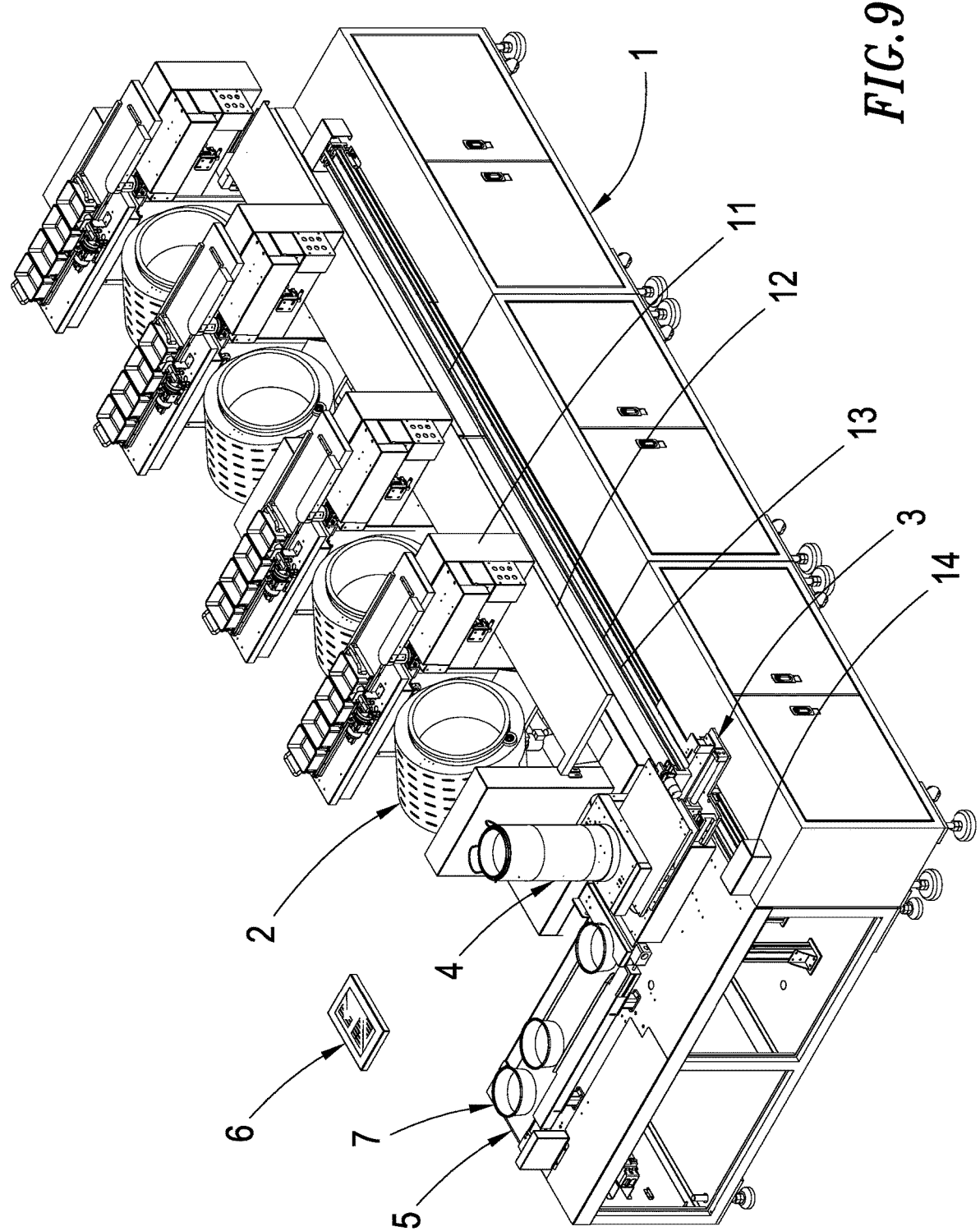
FIG. 9 shows a stereo view of the displacement process implemented by the load stage in the food frying machine according to the present invention.
Figure 10:
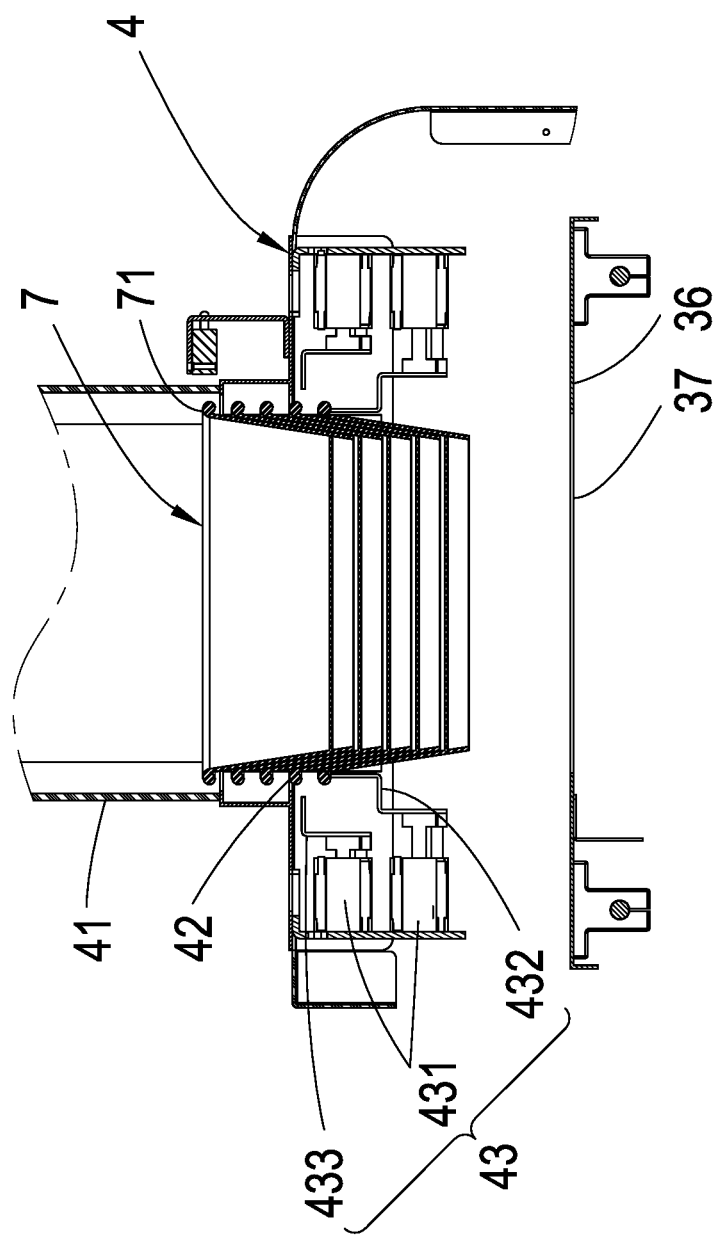
FIG. 10 shows a locally cross-sectioned view of the container supply process implemented by the container supply device in the food frying machine according to the present invention.
Figure 11:
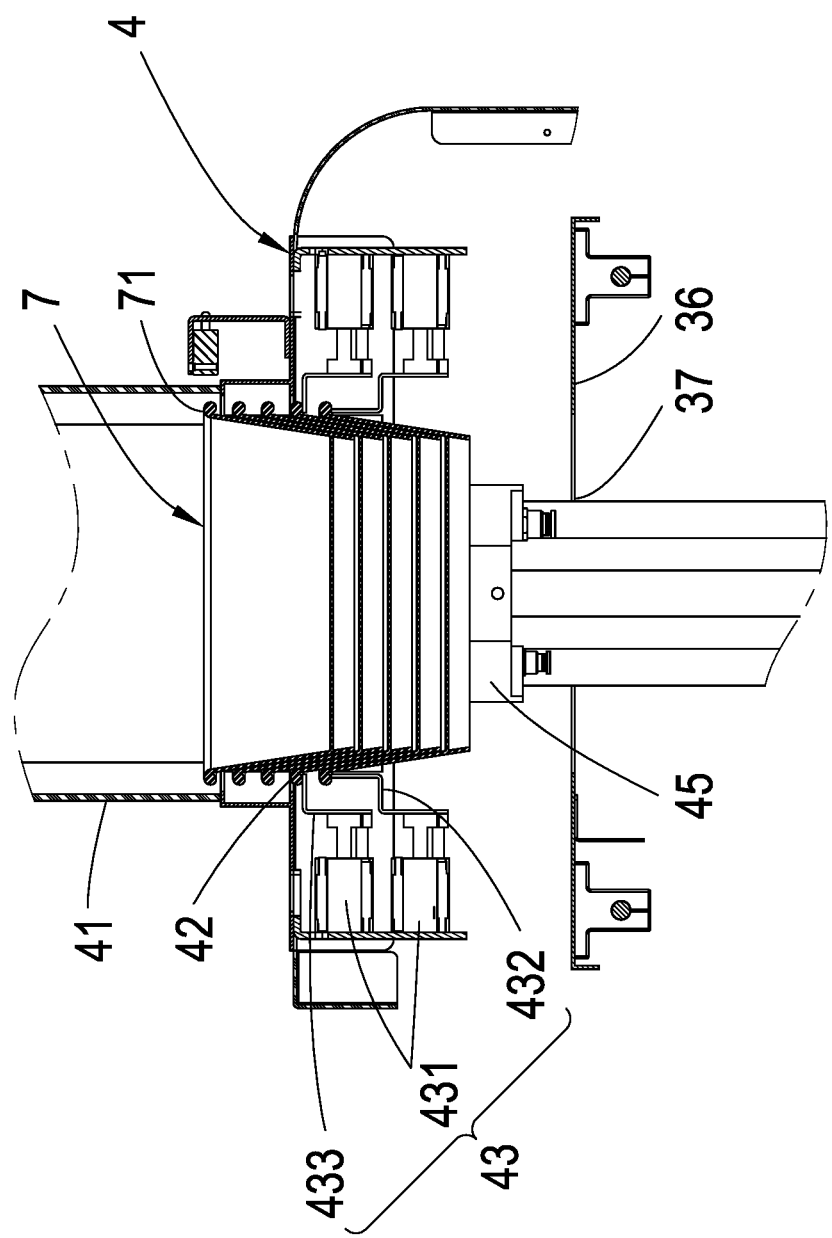
FIG. 11 shows a locally cross-sectioned view of the container supply process implemented by the container supply device in the food frying machine according to the present invention.
Figure 12:
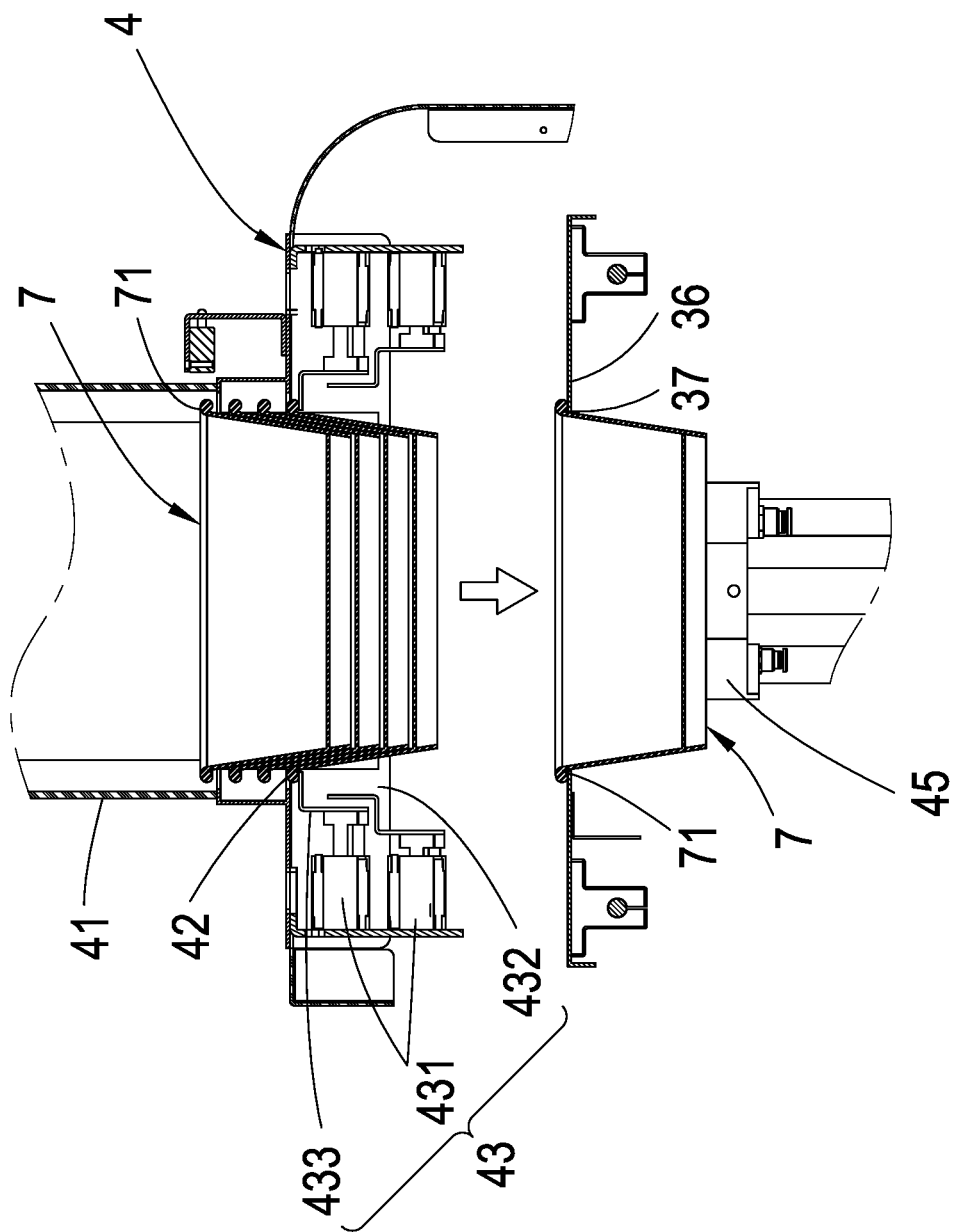
FIG. 12 shows a locally cross-sectioned view of the container supply process implemented by the container supply device in the food frying machine according to the present invention.
Figure 13:
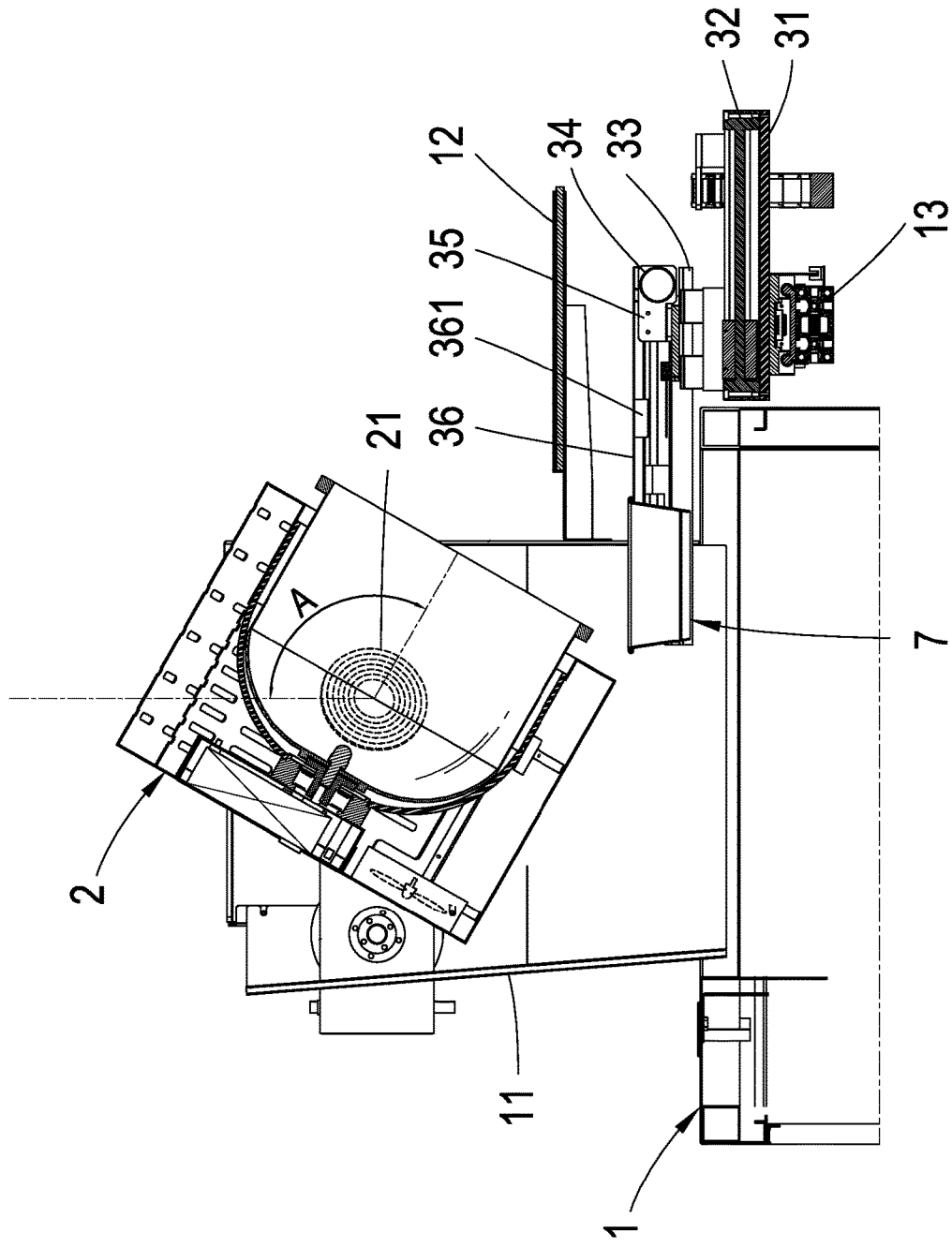
FIG. 13 shows a cross-sectioned view of the food-boxing process implemented by the load stage in the food frying machine according to the present invention.
Figure 14:
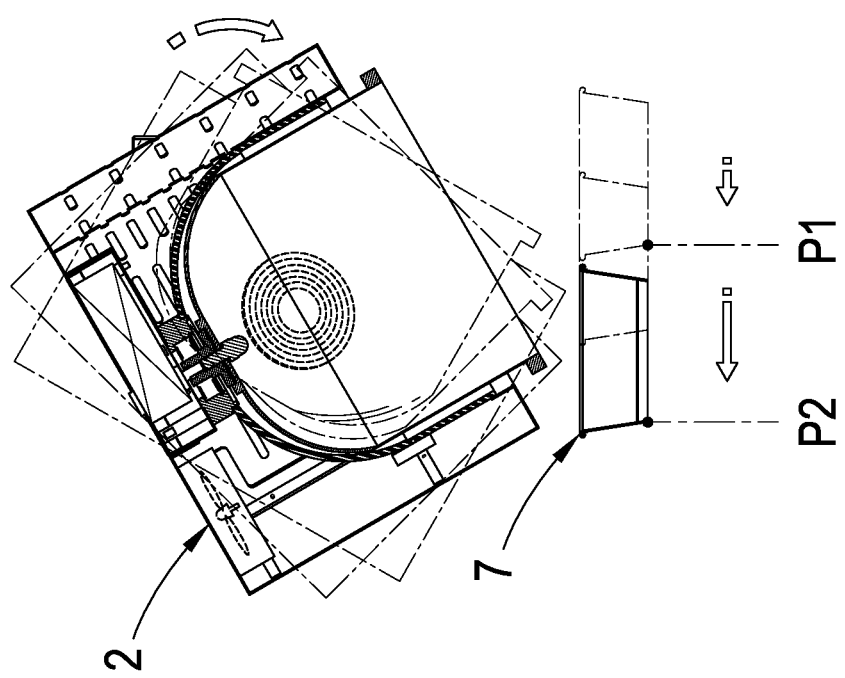
FIG. 14 shows a locally cross-sectioned view of the food-boxing process implemented by the load stage in the food frying machine according to the present invention.
Figure 15:
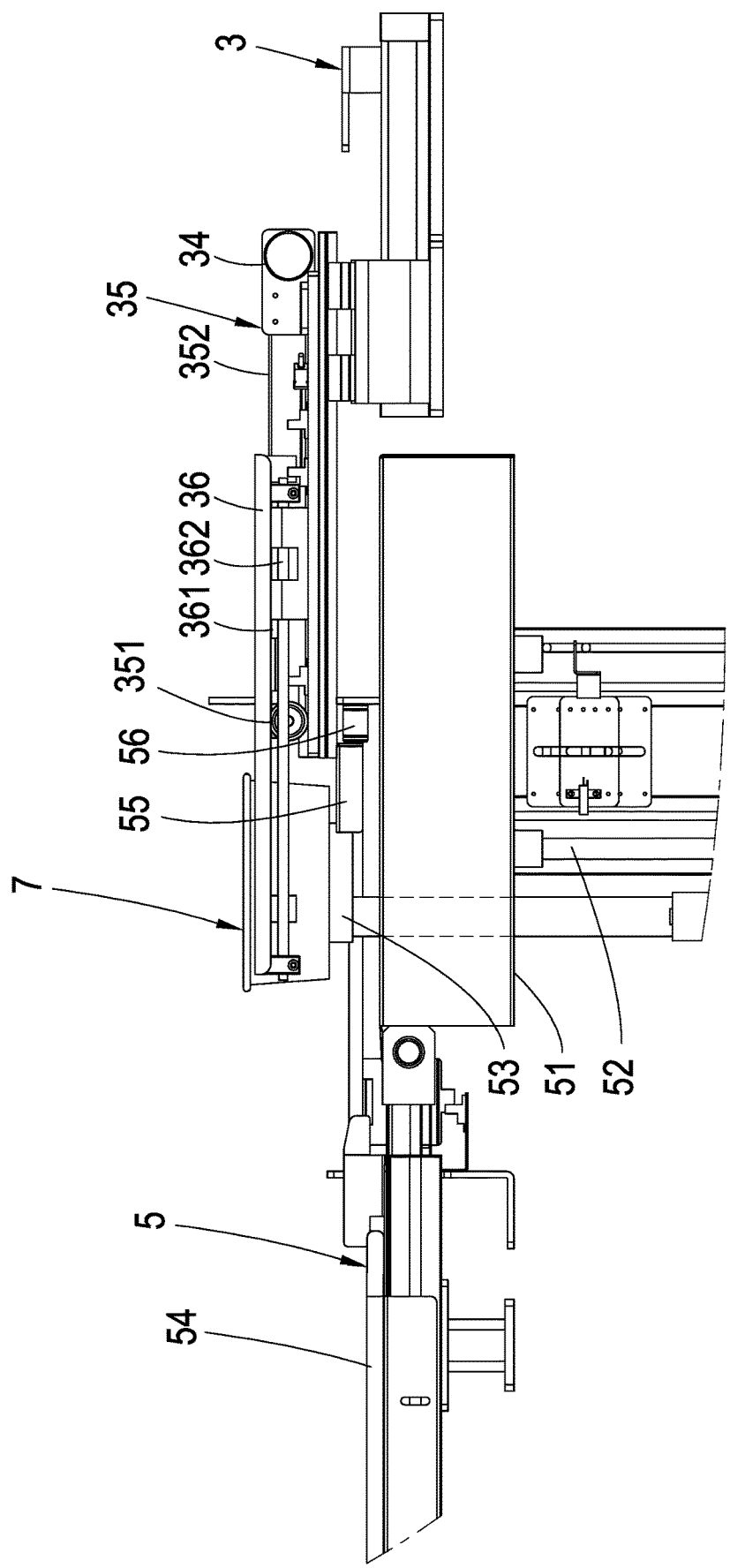
FIG. 15 shows a locally planar view of the meal delivery process implemented by the meal delivery device in the food frying machine according to the present invention.
Figure 16:
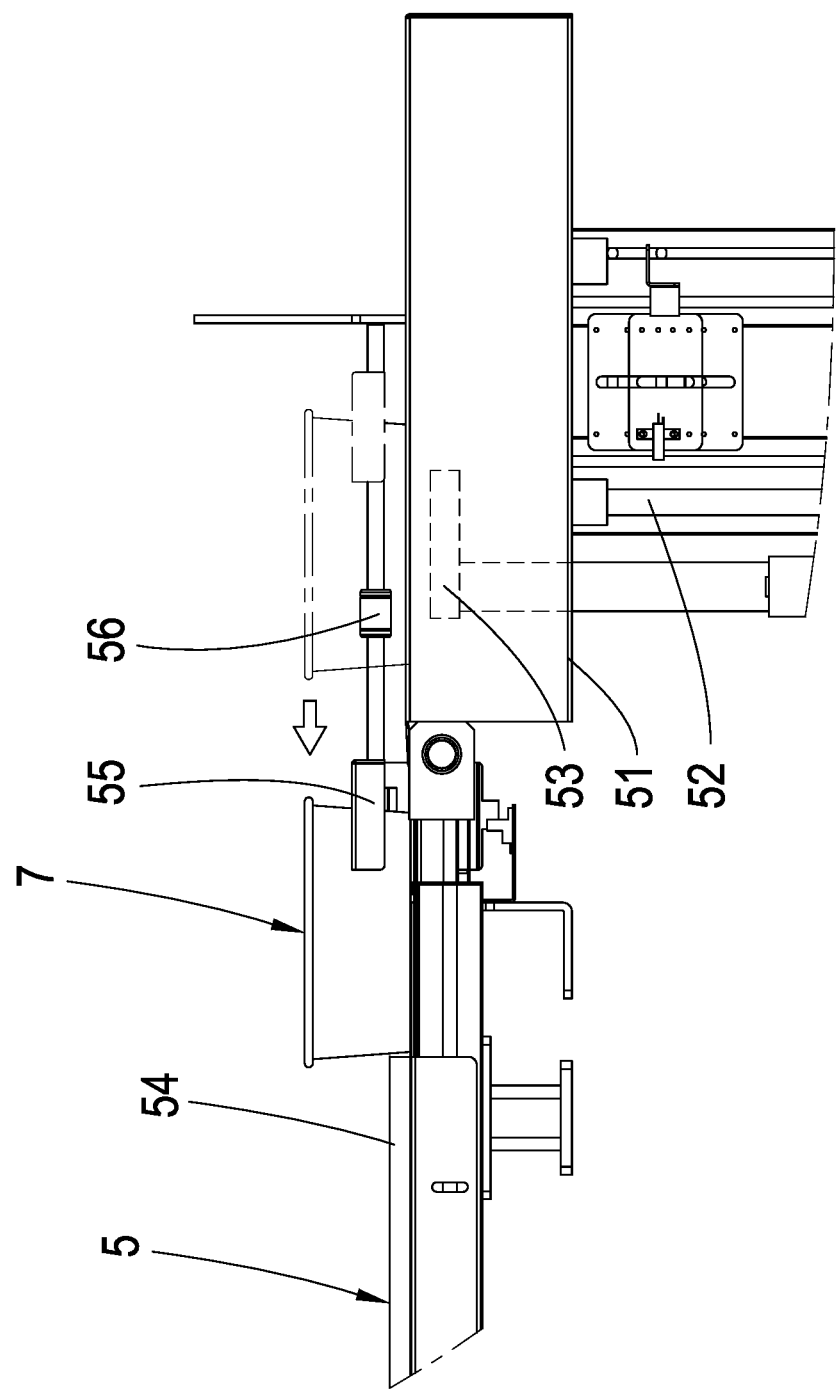
FIG. 16 shows a locally planar view of the meal delivery process implemented by the meal delivery device in the food frying machine according to the present invention.

The operations of each component during the automatic food-boxing processes in the automatic food-boxing device for cooked food of food frying machines according to the present invention will now be explained in details as below. After the food frying pot 2 completes the cooking food process (the details concerning such food frying and cooking, adding ingredients, and seasoning methods can be set by the user, which belongs to the technologies outside the field of the present invention, so it will not be described for brevity), referring to FIG. 9, the slide track driver 14 drives the long slide track 13 so that the movable seat 31 on the long slide track 13 can be brought to the side of the container supply device 4. Referring to FIGS. 10~12, the first abutment block 431 is abutted under the bottom end edge 71 of the container 7, then the cylinder 32 pushes the first layer board 33 below the outlet 42 and the control component 433 retracts the first abutment block 431 inwardly such that the end edge 71 of the lowest container 7 falls onto the second abutment block 432 thus allowing the first abutting block 431 to extend once again so as to abut against the lower portion of the end edge 71 of the second lowest container 7, so that the first lifter device 44 can be activated to lift the first sucking device 45 to the bottom of the lowest container 7 to suck and pull it; then, the second abutment block 432 retracts inwardly to allow the first sucking device 45 to descend thereby transferring the sucked lowest container 7 into the load hole, returning the first layer board 33 and bringing back the movable seat 31 to the side of the food frying pot 2. Subsequently, referring to FIGS. 3~5 and 13~14, the servo motor 21 turns the food frying pot 2 to an inclination angle A, and the cylinder 32 also pushes the first layer board 33 to a start position P1 under the front side of the food frying pot 2 at the same time. Next, the transfer motor 34 and the servo motor 21 together operate synchronously to make the food frying pot 2 turn and rotate, and meanwhile, the second layer board 36 (the transfer motor 34 drives the transfer device 35 such that the push block 361 brings the second layer board 36 to move) also moves along the turning angle, thereby that the food in the food frying pot 2 can be sequentially poured little by little into the container 7 placed in the load hole 37, and when the second layer board 36 is moved to an end position P2, the food held in the food frying pot 2 can be completely poured into the container 7 and the baffle 12 can prevent foreign objects from falling into the container 7. Moreover, referring to FIGS. 1 and 15~16, the slide track driver 14 drives the long slide track 13 so that the movable seat 31 located on the long slide track 13 can be brought to the side of the meal delivery device 5, then the cylinder 32 pushes the first layer board 33 to the top of the second sucking device 53, activating the second lifter device 52 to pull up the second sucking device 53 to the bottom of the container 7 containing food to suck it, and continue to ascend so as to lift the container 7 out of the load hole 37; then after the cylinder 32 retracts the first layer board 33, the second sucking device 53 is lowered to the preset stage 51 so the container 7 corresponds to the side of the push component 55, then the push motor 56 drives the push component 55 so that the push component 55 pushes the container 7 to the transfer device 54, and the staff or automated machinery and equipments can take out the container 7 containing food from one end of the transfer device 54 for subsequent package and shipment processes.

Figure 17:
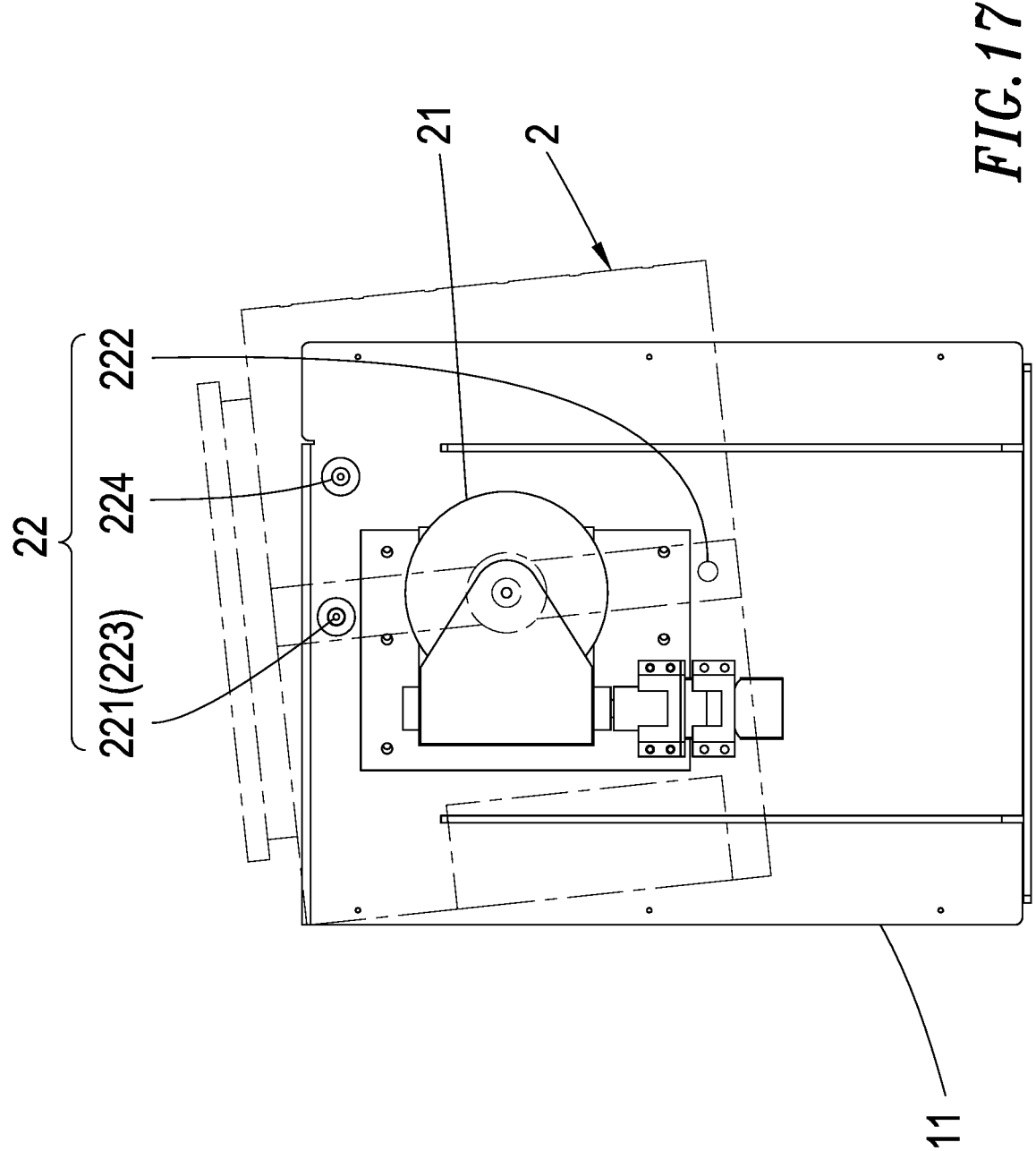
FIG. 17 shows a planar view of the stir-rotation position sensing process implemented by the position difference sensing device in the food frying machine according to the present invention.
Figure 18:
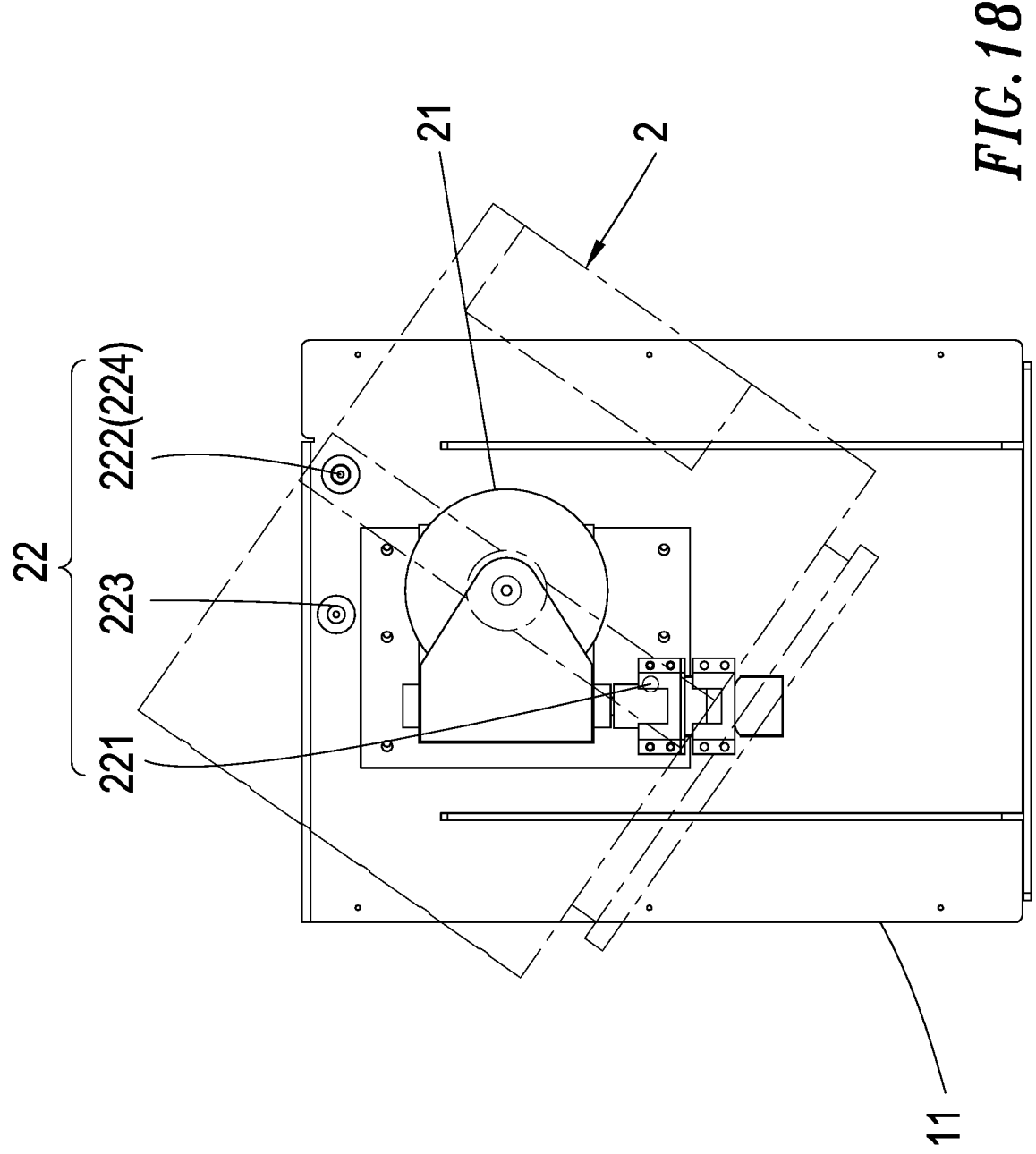
FIG. 18 shows a planar view of the stir-rotation position sensing process implemented by the position difference sensing device in the food frying machine according to the present invention.

In addition, referring to FIGS. 17~18, in the automatic food-boxing device for cooked food of food frying machines according to the present invention, when the food frying pot 2 is operating, if the start sensing terminal 223 senses the start position determination block 221, or the end sensing terminal 224 senses the end position determination block 222, the master controller 6 will control the servo motor 21 to stop its operation in both cases. In the present embodiment, it can be seen that, when the start sensing terminal 223 detects the start position determination block 221, the food frying pot 2 is at the position of 8°, and, on the other hand, when the end sensing terminal 224 detects the end position determination block 222, the food frying pot 2 is at the position of 215°, indicating that the safe angle range of the outer case body 2 is between 8°~215°, and since the food frying pot 2 is restricted to fall within such a start/end angle range, the food frying pot 2 can only return to the standby position by way of the reverse rotation approach so as to prevent continuous rotation actions which may adversely lead to coil or wire winding issues.

Furthermore, referring to FIGS. 3~5, it can be appreciated from the embodiment of the automatic food-boxing device for cooked food of food frying machines according to the present invention that a position limiting slot 331 may be additionally set up on the first layer board 33, a position limiting block 362 may be also additionally set up on the second layer board 36, and the position limiting block 362 is pivotally installed within the position limiting slot 331 such that the second layer board 36 can move more stably when the transfer motor 34 drives the transfer device 35.

Moreover, also referring to FIGS. 3~5, it can be appreciated from the embodiment of the automatic food-boxing device for cooked food of food frying machines according to the present invention that a position shift sensing device 38 may be installed between the first layer board 33 and the second layer board 36, the position shift sensing device 38 is connected to the master controller 6 and has plural stroke sensing seats 381 installed on the first layer board 33 as well as a sensor 382 installed on the second layer board 36, and the sensor 382 can sequentially pass each of the stroke sensing seats 381 by means of moving along with the second board 36 so as to further incessantly acquire the position messages about the movement of the second layer board 36 thereby precisely controlling the synchronous operations of the transfer motor 34 and the servo motor 21.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alterations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:

1. An automatic food-boxing device for cooked food of food frying machines, comprising:
    a machine body, configured with at least a support body and a long slide track, in which one side of each support body is installed with at least a baffle, the baffle and the long slide track correspond on the same side of each support body, and one end of the long slide track is installed with a slide track driver;
    a food frying pot, mounted on the support body, in which the food frying pot and a servo motor are mutually pivoted;
    a load stage, having a movable seat installed on the long slide track, in which the movable seat is installed with a cylinder including a first layer board, the first layer board is set up with a transfer motor and a transfer device, the transfer device is installed with a second layer board, and the second layer board is openly configured with a load hole;
    a container supply device, including a placement shelf installed beside the long slide track, in which the inside of the placement shelf is used for filling a large number of stacked containers, an outlet is openly configured below the placement shelf, two sides corresponding to a lower part of the outlet are respectively installed with mutually symmetrical container supply assemblies, each of such container supply assemblies has a first abutment block located below the outlet, a second abutment block is installed below the first abutment block, the first abutment block and the second abutment block are respectively used to abut against the lower end edges of a lowest or a second lowest containers, the first abutment block and the second abutment block are respectively assembled on at least one control component, a first lifter device is also installed below the container supply assembly, and a first sucking device is further set up on the first lifter device;
    a master controller, respectively connected to the slide track driver, the servo motor, the transfer motor, the control component, the first lifter device and the first sucking device thereby controlling actions and parameters of such elements;
    accordingly, the servo motor turns the food frying pot to an inclined angle, the cylinder pushes at the same time the first layer board to a start position below the front side of the food frying pot, then the transfer motor and the servo motor operate simultaneously to turn and flip the food frying pot, the transfer motor brings at the same time the transfer device to allow a push block to drive the second layer board such that the second layer board also moves together along with a flipped angle, the food inside the food frying pot can be sequentially poured little by little into the container placed in the load hole, and all the food can be completely poured into such containers when the second layer board reaches an end position.

2. The automatic food-boxing device for cooked food of food frying machines according to claim 1, wherein the servo motor is installed inside the support body.

3. The automatic food-boxing device for cooked food of food frying machines according to claim 1, wherein at least a baffle is installed on one side of each support body, and the baffle and the long slide track are correspondingly located on the same side of each support body.

4. The automatic food-boxing device for cooked food of food frying machines according to claim 1, wherein a position difference sensing device connected to the master controller is installed on the outside of the food frying pot, the position difference sensing device respectively includes a start position determination block, an end position determination block, a start sensing terminal and an end sensing terminal, in which the start position determination block and the end position determination block are individually installed on the surfaces of the exterior of the food frying pot opposite to the support body, while the start sensing terminal and the end sensing terminal are individually installed on the surfaces of the exterior of the support body opposite to the food frying pot, and the position difference sensing device is applied to sense the positions of the initial and the final points during the rotation of the food frying pot in order to restrict the food frying pot to move within a safe angle range.

5. The automatic food-boxing device for cooked food of food frying machines according to claim 1, wherein a position limiting slot is set up on the first layer board, a position limiting block is set up on the second layer board, and the position limiting block is pivotally installed within the position limiting slot thereby allowing the second layer board to move more stably.

6. The automatic food-boxing device for cooked food of food frying machines according to claim 1, wherein a position shift sensing device is installed between the first layer board and the second layer board, the position shift sensing device is connected to the master controller and has plural stroke sensing seats installed on the first layer board as well as a sensor installed on the second layer board, and the sensor can sequentially pass each of the stroke sensing seats by means of moving along with the second board so as to further incessantly acquire the position messages about the movement of the second layer board thereby precisely controlling the synchronous operations of the transfer motor and the servo motor.

7. The automatic food-boxing device for cooked food of food frying machines according to claim 1, wherein the transfer device has two gears and one belt, and one of such two gears is installed on the transfer motor while the other one is pivotally installed on the first layer board, and the belt is set on such two gears, the bottom of the second layer board is installed with at least one push block which is used to be fixedly installed on the belt such that the belt can bring the second layer board to move.

8. The automatic food-boxing device for cooked food of food frying machines according to claim 1, wherein a meal delivery device is installed beside the long slide track and includes a preset stage installed beside the long slide track, a second lifter device is set up below the preset stage and a second sucking device is installed on the second lifter device, a transfer device is installed beside the preset stage, and a push component is installed on the preset stage and connected to a push motor, and wherein the second lifter device, the second sucking device, the transfer device and the push motor are all electrically connected to the master controller.

9. The automatic food-boxing device for cooked food of food frying machines according to claim 8, wherein the lateral side of the push component is openly configured with a recess portion.

\* \* \* \* \*